United States Patent [19]
Van Huisen

[11] 3,864,208
[45] Feb. 4, 1975

[54] GEOTHERMAL-NUCLEAR WASTE DISPOSAL AND CONVERSION SYSTEM

[75] Inventor: Allen T. Van Huisen, Rolling Hill Estates, Calif.

[73] Assignee: Kinichi Watase, Redondo Beach, Calif.; a part interest

[22] Filed: Apr. 11, 1972

[21] Appl. No.: 242,941

[52] U.S. Cl. ............... 176/39, 166/247, 166/272, 166/303, 176/DIG. 4
[51] Int. Cl. ..................... G21f 9/08, E21b 43/25
[58] Field of Search ........ 176/DIG. 4, 39; 203/100; 201/25; 166/247, 272, 303

[56] References Cited
UNITED STATES PATENTS

| | | | |
|---|---|---|---|
| 3,140,986 | 7/1964 | Hubbard | 203/100 X |
| 3,383,228 | 5/1968 | Rekate et al. | 203/DIG. 5 A |
| 3,470,943 | 10/1969 | Van Huisen | 165/45 |
| 3,606,999 | 9/1971 | Lawless | 210/63 |
| 3,608,636 | 9/1971 | Dixon | 166/247 |
| 3,640,336 | 2/1972 | Dixon | 166/247 |

Primary Examiner—Carl D. Quarforth
Assistant Examiner—Roger S. Gaither
Attorney, Agent, or Firm—Marvin E. Jacobs

[57] ABSTRACT

A fractured, porous, rubble cone cavity is produced within a deep geothermally-heated host zone. Organic waste such as sewage and/or garbage is injected into the cavity. The heat and pressure within the cavity released from a thermonuclear device and/or permeating into the cavity from the host zone pyrolytically decomposes and destructively distills the organic wastes to useful products comprising oil, gas and steam products which are recovered from the zone and are separated for further utilization.

13 Claims, 2 Drawing Figures

GEOTHERMAL-NUCLEAR WASTE DISPOSAL AND CONVERSION SYSTEM

BACKGROUND OF THE INVENTION

1. Field of the Invention

The present invention relates to recycling of organic waste material and, more particularly, this invention relates to geothermal and nuclear pyrolytic decomposition of organic waste into useful recyclable products.

2. Description of the Prior Art

Accumulation of solid waste has reached unmanageable proportions. It is estimated that last year U.S. municipalities spent about $4.5 billion to collect and dispose of nearly 350 million tons of solid waste, much of which went to open land dumps. by the early 1980's, solid discards are expected to exceed 0.5 billion tons annually. Solid waste disposal is one of the nation's most pressing environmental problems.

The resource potential of such waste is obvious. However, solid waste recovery has been limited to the recovery of simple and homogenous wastes from industry and most waste reclamation passes up mixed sources such as municipal, mining and industrial wastes. Most effort has been directed to the recovery of easily classifiable solid materials such as glass and various metals. Recently, pilot plant studies of pyrolysis as a method of recovering organic wastes by converting it into various gaseous, liquid organic and char products has been conducted. However, industrial commercialization of refuse pyrolysis is not possible because of low profitability and other political and performance problems, even though this is a potential way of producing petroleum and gas fuels, a rapidly depleting resource.

Petroleum and gas deposits have traditionally been considered to have originated in sedimentary formations via decay, and decomposition of organic materials implemented by the heat conducted from or the intrusion of igneous rocks. Research indicates that high temperature mechanisms may be responsible for the origin of some of the largest currently producing gas reserves. Extensive laboratory research indicates that some gases from fields under study were formed at temperatures much higher than normally exist in sedimentary rocks where organically produced methane usually forms at less than 100°C.

In the process followed by nature, a vast organic deposit accumulates and assembles year after year, which assisted by decay and decomposition and gathered by the erosion of air, wind and water forces, deposits in basins and continental shelves. The deposit slowly becomes deeper and deeper buried by the accumulation process and is converted into organic-rich sedimentary rocks which are finally invaded by sufficient geothermal heat to convert the organic materials into petroleum and gas.

The time axis required by nature to perform this cycle requires millions of years to bring the proper forces and materials together in order to form a single major deposit of oil or gas. In contrast to this natural process, man has established vast organic gatherings systems in conventional sewage and garbage collection systems. Vast quantities of organically-rich wastes are gathered in a single day by such systems. However, such accumulated resource is wasted and creates a rather serious disposal problem in the environment rather than exploiting and developing the natural resource that is inherent in this material.

OBJECTS AND SUMMARY OF THE INVENTION

It is therefore an object of this invention to provide a system for the economic conversion of organic waste into useful products.

A further object of the invention is the provision of a technique for destructive distillation pyrolytic conversion of organic wastes into high heat value gas and oil products.

Yet another object of the invention is the provision of an organic waste conversion system including means for filtering entrained solids from the gas and liquid byproducts before recovery.

A still further object of this invention is the provision of a system for the economic disposal of large quantities of organic waste material and the conversion thereof into usable and valuable steam, oil and gas product streams within a relatively short time span and conveying these products to the surface for separation and utilization.

These and many other objects and attendant advantages of the invention will become apparent as the description proceeds.

In accordance with the present invention, a large waste disposal area deep within the earth is created by the explosion of a nuclear fusion or fission device, preferably in a deep preselected geothermal environment. The residual heat energy from the exploded device and from the geothermal heat zone combine to pyrolytically convert the organic wastes which have been injected into the cavity and to convert the waste by destructive distillation into usable products. The invention permits a disposal of environment contaminating waste materials in a non-polluting method while affording the recovery of critically short oil, gas, steam and hot water products. The oil produced within the cavity being of lower specific gravity than water will rise and accumulate in the upper portion of the rubble cone and will serve to filter out particles contained in the rising gases. The level of oil accumulated in the cavity is controlled by measured withdrawal through a separate conduit extending from the surface into the oil reservoir and through which the accumulated oil flows or is pumped to the surface. Pre-injection treatment and selection of organic waste can be performed to maintain a desired quality and to assure maximum efficiency and product recovery through the system. On site power can be generated from the steam and ready markets exist for the oil and gases produced by the system of the invention.

The deep-well waste disposal system of the invention generally includes a well drilled into the earth interior into a strata at a sufficient depth to provide a geothermal temperature of at least 300°F and including a cavity and chimney created by a nuclear detonation at the bottom of the well. Gas, steam and oil products may be recovered through the original well drilled for placement of the device. A further well is drilled into the porous zone of the cavity for the injection of the waste and still another well containing a closed end heat exchanger may be drilled into the cavity for indirect heating of heat exchange fluid to provide a heat and power source. The system will also include waste pretreatment and gas and oil storage vessels and power generating equipment.

The injected waste will retort under the pressure and heat present within the cavity and will convert the organic waste material into gas, oil and steam which are recovered for utilization.

The invention will now become better understood by reference to the following detailed description when considered in conjunction with the accompanying drawings.

DESCRIPTION OF THE PREFERRED EMBODIMENTS

Figure 1:
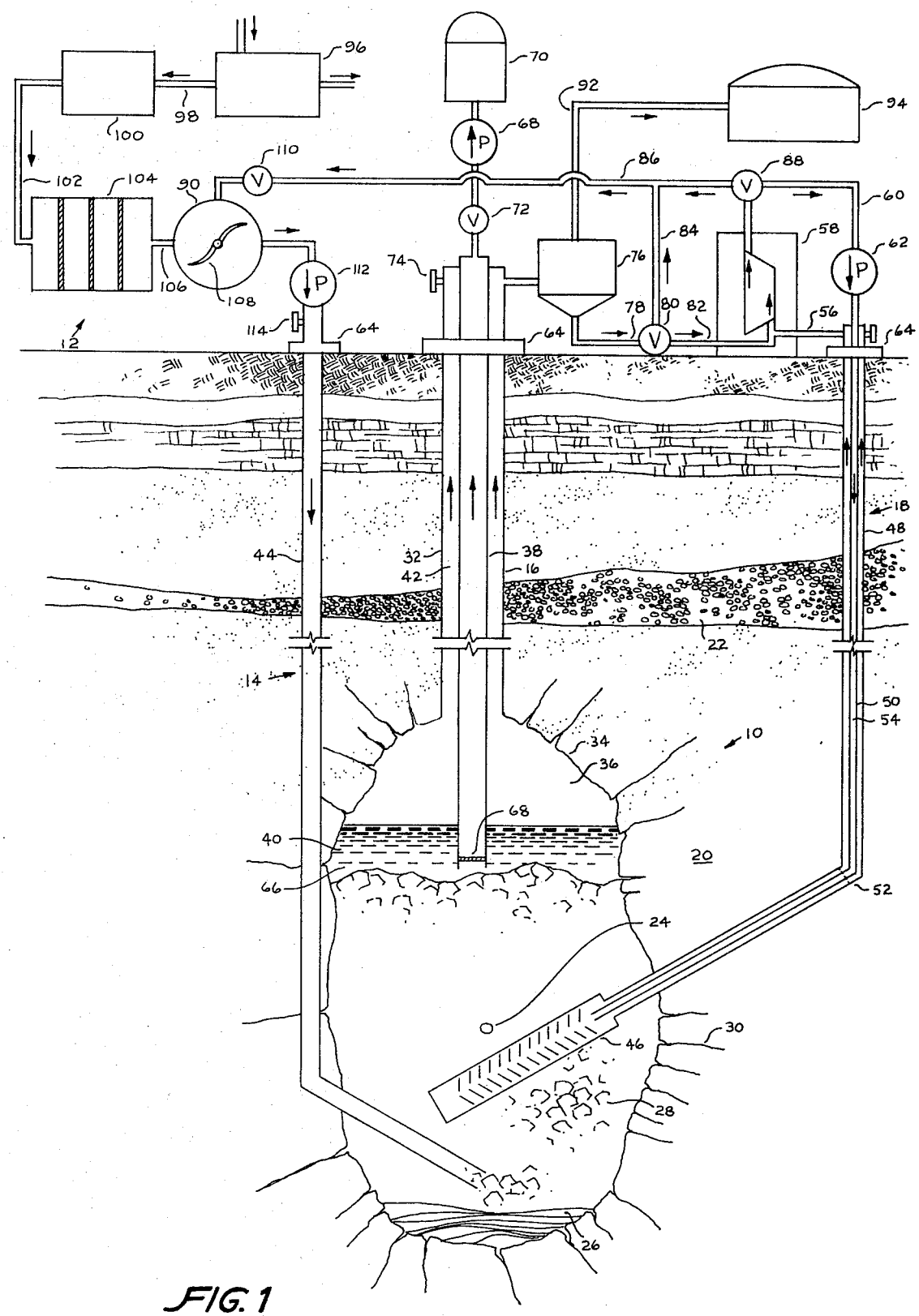
FIG. 1 is a schematic view of a first embodiment of the invention.

The Plowshare program is investigating the creation of nuclear produced craters and is interested in providing systems for the peaceful utilization of the craters. The first contained underground nuclear detonation was demonstrated in September, 1957 in a test called "Rainier." The experiment was completely successful and established the feasibility of underground nuclear devices. When the device is detonated underground in a competent geological strata, the weight of the earth will serve to contain the explosion. The explosion will fracture and cavitate a substantial area of the adjacent rock to form a rubble cone protecting both the heat source from the detonation and from the fractured geothermal rock. Such detonations are attendant with many difficulties.

One of the dangers relates to the distribution of radioisotopes within the cavernous and fractured area after the explosion. This limits the introduction of heat exchange fluids such as water to form steam for heating or power generation purposes. Without special precautions, such radio-elements are a hazard to the surface areas where the heat exchange fluid is to be utilized.

Radioactive shielding and control devices are both expensive and the devices are of limited reliability. This greatly adds to the cost of mining and utilization and precludes the selection of such a system as a pollution free low cost source of energy. Another problem is that the cost of detonation is fairly high. Therefore, the final cost of energy may not be economical or such great cost only a very large user could consider such an investment.

Furthermore, the earth's geothermal gradient coupled with the specific heat of the average sedimentary rock demonstrates that there is a vast amount of heat energy flowing both towards and parallel to the surface of the earth through the upper few miles of the earth's crust. This source of heat in the upper few miles of the earth's crust may be from the outward flow of heat from the core of the earth, from the cooling of igneous magmas, from the disintegration of radioactive elements, from the frictional heat formed during diastrophism, (the rubbing together of individual grains), and from the exothermal chemical reactions that take place within permeable reservoir rocks.

The mean heat flow from the interior of the earth to the surface of the earth as in continental North America averages approximately $1.2 \times 10^{-6}$ calories per centimeter per second. Zones or areas with much higher heat flow are known. A zone approximately 50 to 100 miles wide and several thousand miles long extends from Easter Island in the Pacific into the Gulf of California and on into the Southern part of the United States, where the heat flow is five to eight times normal. Substantial areas of the world are underlayed by rocks or abnormally high temperatures. In many places, heat flow in these regions is much as 10 times that of the normal crust.

The average heat flow indicates a temperature gradient in a geological region of average rock type of approximately 1°C per 100 feet of depth. In areas of abnormally high heat flow, the temperature gradient may be as much as 10°C per 100 feet of depth, or more. In areas of hot spring activity or recent volcanic activity, substantially higher temperature gradients may be found over extensive areas. In many regions, temperatures of as much as 500°C may be found at depths of 10,000 feet or shallower. A substantial amount of energy is stored in such a volume of rock.

The following table indicates the thermal gradient of normal and abnormal geothermal areas and also indicates the initial residual temperature to be expected from a deep seated detonation of a nuclear device.

TABLE I

| TEMPORARY RESIDUAL CAVITY TEMPERATURE | ABNORMAL GEOTHERMAL GRADIENT, °F | NORMAL GEOTHERMAL GRADIENT, °F | DEPTH FEET |
|---|---|---|---|
| | | 80 | 500 |
| | | 90 | 1000 |
| | | 100 | 1500 |
| | | 110 | 2000 |
| | | 120 | 2500 |
| | | 130 | 3000 |
| | | 140 | 3500 |
| | | 150 | 4000 |
| | | 160 | 4500 |
| | | 170 | 5000 |
| | | 180 | 5500 |
| | | 190 | 6000 |
| | | 200 | 6500 |
| | | 210 | 7000 |
| | | 220 | 7500 |
| | | 230 | 8000 |
| | | 240 | 8500 |
| | | 250 | 9000 |
| 600°F | 700–900°F | 260 | 9500 |

This system of the invention combines a heating source from the heat evolved by the detonation of the nuclear device and the natural heat permeating into the cavity from the geothermal strata and by introducing sewage results in conversion of the thermal energy into chemical energy by converting the waste into combustible hydrocarbon gaseous and liquid fuels. The utilization of the heat energy can be controlled by the controlled injection rate of the organic sewage material and the controlled withdrawal rate of the gaseous and liquid products in the cavity. The system provides an economic and practical peaceful utilization of nuclear energy and of deep detonated devices as being investigated by the Plowshare program.

Referring now to FIG. 1, the system according to the invention includes a nuclear produced cavity 10, a sewage pretreatment section 12, a sewage injection well 14, a products recovery well 16 and a heat exchange well 18. The cavity 10 is formed in a geothermal heat host zone 20 having a mean temperature of at least 200°C and preferably at least 500°C to 1,000°C. The composition and depth of the host zone should be selected with a view to forming a highly permeable rubble cone.

A nuclear detonation in a sand, limestone or shale formation would be expected to result in substantial compaction of the rubble after formation and some loss of permeability through the rubble cone with time. However, if the nuclear shot were made in basalts, metamorphic rocks or granite rock types in a region of high heat flow, one can expect the rubble cone to stay open and permeable for almost indefinite periods. The latter rock types are common in regions of high heat flow. Another usually coincident geological condition is the presence of a cap rock strata 22 above the hot geothermal layer 20.

This is important since the detonation must be contained to avoid escape of radioactive gases, to contain the thermal energy produced by the nuclear blast and furthermore, to prevent collapse and caving of the surface of the earth. Containment is achieved if the internal cavity pressure is equal to or less than the overburden or lithostatic pressure at the time the shock front wave has been reflected from the surface back to the cavity wall. Experience to date indicates that hard rock layers support the detonation without significantly increased ground support problems. Furthermore, available experiment data from the "Plowshare program" permits the prediction of cavity size, chimney height and tonnage of broken rock for underground nuclear explosions with considerable confidence.

For a specified rock type, predicted accuracy is within 10 percent. Criteria for establishing minimum depths of burial to prevent dynamic venting have also been established. For explosions in hard rock, such dynamic venting can be prevented by a depth of burial equal to the anticipated chimney height plus a 300–500 foot thick buffer of overlying rock cover.

The physical properties of the rock in which the nuclear explosion occurs have little effect on the size of the cavity produced, the limiting parameters being the device yield, the gas-producing constituents of the rock such as water, the depth at which the device is detonated and the average density of the overburden. Upon collapse of the cavity a roughly cylindrical chimney of broken rock is formed with a radius approximately equal to that of the cavity. The mass of highly permeable rock serves as a heated bed reservoir into which the organic wastes are injected.

To be suitable for use in the system of the invention, the cavity reservoir should be sufficiently deep to completely confine the explosion through weight of the overburden. The surrounding rock strata should be thick enough to confine the fractured zone to a specific preselected formation thus preventing contamination of underground waters with organic waste or radioactive elements from the explosion.

The actual energy remaining after detonation as residual thermal energy is strongly dependent on the degree of containment achieved during the nuclear detonation. Ninety to ninety-five percent of the nuclear energy released remains as residual thermal energy, if complete containment is achieved. Large yield explosions at substantial depths appear to provide the best potential for achieving maximum containment of the thermal nuclear energy. This also provides the best potential for longevity of the useful life of the cavity and chimney since the deeper strata will be provided in a hotter geothermal zone.

It is further preferred in accordance with the invention to locate the cavity in an area of abnormally high heat flow. In many cases, magmatic heat at 10,000 feet or more can reach, or exceed 500°F in enormous volumes of rock. Surface steam vents and hot springs are guide posts to regions containing excessive magmatic temperature. Suitably, the detonation and cavity are formed at a depth of at least 5,000 feet and suitably at a depth of at least 10,000 feet.

The cavity is produced by drilling a hole to implant the nuclear device at a shock point 24 in a geothermal hot zone 20. This device is detonated to produce the cavity 10 by the expansion of the explosion produced gases. The lower cavity boundary is characterized by a melt rock interface 26, while the cavity fills with a chimney of broken rock 28 resulting from gravity collapse of the cavity. A zone of fractured rock 30 immediately surrounds the chimney.

For example, a five megaton shot detonated at a depth of 10,000 feet in rock having a geothermal temperature of approximately 500°C can be expected to provide a cavity approximately 500 feet in radius. This cavity will have a volume of approximately $5 \times 10^8$ cu. ft. The cavity will collapse in a few seconds after its formation and a rubble cone extending upwardly towards the surface of the earth is formed by successive caving actions. If the porosity of the rubble is approximately 12 percent, the volume of rubble in the cone equal to approximately eight times the volume of the cavity will be formed. This rubble cone will extend upwards to approximately 2,000 feet from the surface of the earth. There will be approximately $4 \times 10^9$ cu. ft. of rubble in the cone and the mean temperature of the rubble will be approximately 350°C.

The specific gravity of the rock can be assumed to be about 2.5 and its specific heat to be about 0.25. At temperatures above 100°C, approximately $4.5 \times 10^6$ calories are available from each given foot of rock. Thus, there are $1.8 \times 10^{16}$ calories of energy available in such a rubble cone. This contrasts with the heat liberated by the explosive which is approximately $5 \times 10^{15}$ calories. In summary, the amount of heat available is approximately 5 times the heat of the energy of the explosive.

As an illustrative example of a large yield detonation, a 40 kiloton underground nuclear explosion 2,700 feet below the surface will produce the following estimated environment. A cavity having a radius of 110 feet will be formed including a permeable zone having a radius of 270 feet and a maximum radius of 385 feet. The permeable zone height will be about 630 feet and the maximum height about 900 feet. The cavity and/or chimney void volume would be 5.7 million cubic feet. The probable permeable zone volume would be 140 million cubic feet or 3,220 acre/ft. The maximum permeable zone volume would be 420 million cubic feet or 9,650 acre feet. This results in a total cavity and chimney volume of 23 million cubic feet or 528 acre/ft.

The original bore hole 16 is lined with a casing 32 which extends into the top of the chimney 34 and communicates with the void space 36 at the top of the cavity. An oil recovery conduit 38 extends through the casing 32 and into the oil layer 40 which forms on top of the rubble cone 28. The gaseous products collecting in the void space 36 advance through the annulus 42 of the recovery well 16 to the surface for recovery.

A sewage injection well 14 is drilled adjacent the rubble cone and extends into the bottom portion of the hot rubble 28. The well 14 is lined with a casing 44. A further heat recovery well 18 may be drilled adjacent the cavity 10 and includes a closed end heat exchange portion 46 extending into the hot rubble cone 28. A central heat exchange fluid injection pipe 50 extends through the casing 48 of this well into the top of the heat exchange portion 46. The heated fluid exchange permeates through ports 52 in the top end of the heat exchange portion and advances through the annular space 54 of the casing 48 to the surface for recovery.

The heat exchange well 18 may utilize water as the heat exchange fluid. The generated steam will be removed from the casing 48 through line 56 to drive the turbine for the power plant 58. The condensed steam from the turbine can be reinjected through line 60 and by means of pump 62 into the pipe 50 feeding the heat exchanger 46. The heat exchanger 46 may also be operated with a low boiling point fluid such as Freon 14 (a chlorofluoroalkane) or isobutane can be circulated through heat exchanger 46 to extract heat energy from the cavity and the vapors may be returned to the surface for on site power production. In the case of Freon or butane, the heated fluid from annulus 54 can pass through a heat exchanger at the surface in indirect heat exchange with water to provide steam for use in the power plant 58. The heat exchange well 18 and heat exchanger 46 may be constructed and operated according to my previous U.S. Pat. No. 3,470,943 entitled "Geothermal Exchange System."

Each of the deep wells 14, 16 and 18 are provided with suitable pressure control means and fluid monitoring means and such other equipment that is necessary to insure the efficient and trouble free operations of the wells for the intended purposes. The wells in each case contain a header 64 capable of maintaining pressure within the zone suitable for the pyrolytic dissociation of the organic feed.

The sewage slurry introduced through casing 44 is vaporized by the hot rubble 28 into steam, carbon oxides and organic vapors. As the vapors rise through the rubbel 28 they are destructively distilled and pyrolytically decomposed into hydrocarbon gases such as methane, ethane, oxygenated products, such as carbon oxide and carbon monoxide and hydrogen and some carbon char. The process continues and the higher boiling materials will form a layer 40 of oil on top of rubble cone 28 which will act to filter and retain particles 66 from rising into the heat space 36. A screen 68 can be provided at the bottom of central conduit 38 to prevent the particles from rising to the surface.

The oily liquid is pumped through conduit 38 by means of pump 68 and is stored in oil reservoir tank 70 when valve 72 is opened. The gaseous products within heat space 36 which include hydrocarbon gases such as methane and ethane and propane and steam and non-combustible gases such as nitrogen and carbon dioxide rise through the annular space 42 when valve 74 is opened and are separated within separator 76 into a first lower steam stream and an upper gaseous stream. The steam stream passes into conduit 78 and is split at junction 80 into a first stream 82 which is delivered to the power plant 58 and a second stream 84, which enters recycle conduit 86. Recycle conduit 86 is also supplied with part of the distilate from power plant 58 by means of the branch stream splitter 88. Recycle conduit 86 feeds hot water to the sewage slurrying tank 90. The gaseous stream is delivered from the separator 76 by means of pipe 92 into the gas storage container 94.

The raw sewage is subjected to some preliminary treatment before delivery to sewage slurrying tank 90. Sewage is first subjected to classification in classifier 96 to remove non-combustible materials such as metals and glass. These materials have separate economic value and may be recycled and sold to various bottle and metal manufacturers. The classified sewage is delivered through pipe 98 to a size control unit 100 which may crush and shred or compact, as is required. The sized sewage is delivered to storage tank 104 through conduit 102 and is fed through pipe 106 into the slurrying tank 90. The slurrying tank 90 has an agitator 108 and receives a controlled flow of hot water regulated by valve 110. The slurried garbage is pumped by means of pump 112 into casing 44 when valve 114 is opened.

Pyrolysis of the organic waste slurry yields superheated steam, some nitrogen and carbon oxide gases and organic gaseous, liquid and solid products. Pyrolysis is defined as chemical change brought about by the action of heat. It is carried out in an atmosphere absent oxygen. The process of the invention is applicable to municipal or industrial organic wastes such as wood, paper, plastic, cloth or the sludge by-product from primary and secondary treatment of municipal wastes. Classification study of a typical land fill was made to determine the average composition and municipal waste. The average findings are reported in the following table.

TABLE II

| CONSTITUENT | % AS RECEIVED | % MOISTURE | % ON DRY BASIS WITH METAL & GLASS | WITHOUT METAL & GLASS |
|---|---|---|---|---|
| Paper | 46.16 | 8.23 | 42.36 | 50.40 |
| Yard Trimmings | 21.14 | 51.30 | 10.30 | 12.25 |
| Wood | 7.48 | 10.50 | 6.69 | 7.96 |
| Rags | 3.46 | 7.40 | 3.20 | 3.82 |
| Rubber | 4.73 | 9.74 | 4.27 | 5.08 |

TABLE II—Continued

| CONSTITUENT | % AS RECEIVED | % MOISTURE | % ON DRY BASIS WITH METAL & GLASS | % ON DRY BASIS WITHOUT METAL & GLASS |
|---|---|---|---|---|
| Plastic | 0.27 | 0.06 | 0.27 | 0.32 |
| Garbage | 0.81 | 57.80 | 0.34 | 0.40 |
| Metal | 7.64 | 0 | 7.64 | 0 |
| Glass | 8.31 | 0 | 8.31 | 0 |
| Moisture | — | — | 16.62 | 19.77 |
|  | 100.00 |  | 100.00 | 100.00 |

A laboratory pyrolysis was conducted in a stainless cylindrical retort at bulk densities of 5, 10, 15 and 20 pcf pyrolyzed at temperatures of 900°, 1,200°, 1,500° and 1,700°F. The evolved non-condensible gases were collected and analyzed. The non-condensible gases evolved from the pyrolysis of the combustible portion of the refuse or hydrogen, carbon dioxide, carbon monoxide, methane, and ethylene. Quantities and quality of the non-condensible gases at various temperature and material bulk densities appear on Table III.

TABLE III

NONCONDENSIBLE GASES (PERCENT BY VOLUME)

| TEMPERATURES F | LBS. PER CU. FT. | $CO_2$ | CO | $CH_4$ | $H_2$ | $C_2H_6$ | $C_2H_4$ | BTU PER CU. FT. | BTU PER LB. COMBUSTIBLE |
|---|---|---|---|---|---|---|---|---|---|
| 900 | 5 | 44.8 | 33.5 | 12.4 | 5.6 | 3.0 | 0.5 | 300 | 569 |
|  | 10 | 45.1 | 34.5 | 12.2 | 5.2 | 1.9 | 1.0 | 283 | 412 |
|  | 15 | 47.0 | 30.7 | 13.7 | 5.1 | 2.4 | 0.9 | 280 | 410 |
|  | 20 | 47.4 | 32.4 | 11.7 | 5.7 | 1.9 | 0.9 | 286 | 395 |
| 1200 | 5 | 31.8 | 30.5 | 15.9 | 16.6 | 3.1 | 2.2 | 376 | 1045 |
|  | 10 | 26.5 | 30.5 | 19.2 | 20.0 | 1.9 | 2.0 | 392 | 1165 |
|  | 15 | 26.0 | 31.0 | 17.9 | 21.9 | 1.8 | 1.4 | 369 | 1117 |
|  | 20 | 27.2 | 28.7 | 18.8 | 21.3 | 2.2 | 1.6 | 387 | 1166 |
| 1500 | 5 | 20.6 | 34.1 | 13.7 | 28.6 | 0.8 | 2.2 | 344 | 1245 |
|  | 10 | 21.6 | 27.2 | 15.5 | 32.1 | 1.1 | 2.6 | 391 | 1842 |
|  | 15 | 21.9 | 24.8 | 15.3 | 34.8 | 0.9 | 2.2 | 389 | 1886 |
|  | 20 | 21.3 | 25.1 | 17.5 | 32.6 | 1.0 | 2.5 | 389 | 1806 |
|  | 25 | 21.6 | 23.3 | 16.2 | 35.0 | 0.8 | 3.1 | 399 | 1976 |
| 1700 | 5 | 18.3 | 35.3 | 10.5 | 32.5 | 1.1 | 2.4 | 351 | 1414 |

The liquid fraction of the pyrolysis products existing in the liquid state at room temperature is a complex mixture containing the water in the original material, the water resulting from pyrolytic decomposition of carbohydrates and organic compounds of varying carbon chain length resulting from the destructive distillation process. Water content of this material is typically about 70–90 percent by weight. The remainder being various aliphatic and oxygenated products such as alcohols, acetic acid, and various tar and oily products. Typically, the pyrolysis products contain about 10–25 percent fixed gases, 55–65 percent of condensibles and 15–25 percent of char. At lower temperatures, the amount of oily liquid products and char will be favored as compared to gaseous products. Gaseous products of higher BTU content can be favored by introduction of steam to the system to promote the water gas reaction with the char residue. This will also maintain the bed in a permeable condition by reaction of the char with superheated steam to form water gas.

Figure 2:
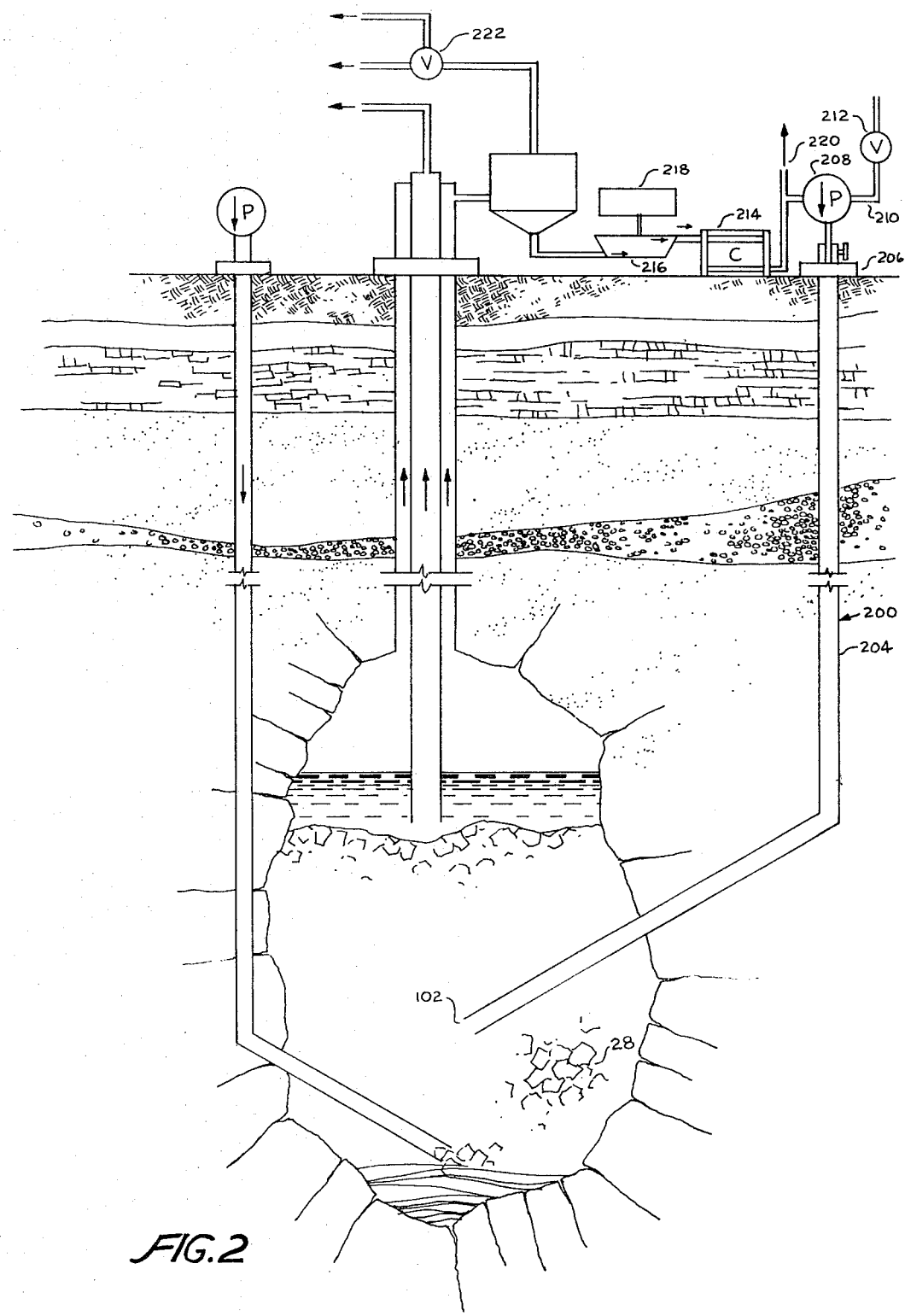
FIG. 2 is a schematic view of a second embodiment of the invention.

Referring now to FIG. 2, wherein like reference numerals indicate like structures, a water injection well 200 is provided which injects warm water into the very hot bed of rubble. The water leaves the open end 202 of the well casing 204 and is vaporized into steam. Steam reacts with the char and tarry residue on the individual grains of rubble to form water gas. The water gas will further react with reducing chemicals in the organic sewage to form fuels of high BTU content.

The water is injected into casing 204 through header 206 by means of a pump 208. The water supply comprises the outflow from condenser 214 which receives the output from turbine 216 which drives electrical generator 218. After condensation, non-condensible gases are removed through vent 220 before the condensed water is delivered to pump 208 for reinjection into the cavity. Additional feed water is delivered through line 210 containing a valve 212 as is required.

The gas output from the annular column 42 of the main recovery well 16 may be subjected to condensation in condenser 222 to separate any entrained or higher boiling oily and liquid products from the gas before processing the gas for further separation or recovery.

The present invention permits the recovery of multiple sources of energy from a single, geothermal-nuclear cavity, that is combustible gases, combustible oils and superheated steam. In addition to providing a multiple resource energy system, this invention provides for the disposal of organic wastes and sewage. While the exact amount of BTU content of the produced gases and oil can only be estimated, a value can be determined for the steam produced.

Steam produced from geothermal wells at the geysers in Sonoma County California cost approximately $1.00 for 9,000 pounds of very low pressure, low grade steam which is equal to 2½ mils per kilowatt hour of electricity produced. The cost of generation and transmission of the power is 3 mils per kilowatt/hour for a total net cost of 5½ mils. This makes this steam generating plant one of the cheapest in the United States.

In the system of the invention, in addition to the enormous quantities of gases and oils, the steam generated would have higher temperatures and pressures and even if only evaluated at the same rate as the geyser steam, the steam alone would be worth $10 million.

Other estimates of life and possible return from the inventive system can be made. The cost of drilling a 30 foot hole to 10,000 feet is estimated at approximately $4 million. The service charge in the nuclear device to be detonated is approximately $1 million. The gas, oil and steam recovery well would cost approximately $2½ million, making a total investment of $7½ million for the multiple resources of the invention. A geothermal steam well has a long lead time from initial steam production to revenue production due to extensive testing of reserves and reservoir characteristics prior to investing in generator and transmission equipment. In the present system one can generate immediate substantial income prior to steam sales from the produced gas and oils generated from the injected organic waste and sewage. In addition, subsidies can be expected from the collection of the raw material since municipalities now pay approximately $8.00 per ton for collection. Furthermore, the system of the invention provides a strategic source of oil and gas for national defense and municipal and industrial usage.

In addition, the cost of generating electricity will be about 1 mil for the steam and 3 mils for generating and transmission costs. This would be the world's cheapest power supply. Thermal pollution problems can be avoided by heat exchange with the waste before injection.

It is to be understood that only preferred embodiments of the invention have been described and that numerous substitutions, alterations and modifications are all permissible without departing from the spirit and scope of the invention as defined in the following claims.

What is claimed is:

1. A method of recycling organic waste comprising the steps of:
   producing a highly permeable cavity containing a bed of hot rock rubble within a deep subsurface geothermal zone having a temperature of at least 300°F. by implanting a thermonuclear device within the zone and detonating the device to produce a porous rubble cone cavity;
   forming an aqueous slurry of said organic waste and injecting said aqueous slurry into the cavity at a point substantially below the surface of the rubble cone and directly into the bed of hot rock rubble;
   pyrolytically decomposing and destructively distilling the waste within the cavity, in absence of oxygen, into steam and high BTU value, combustible, hydrocarbon liquid and gaseous fluid products as the waste rises thru the bed of hot rubble to the upper surface of the rubble cone; and
   transferring said products to the surface for utilization.

2. A method according to claim 1 further including the step of separating said products into gaseous organic, liquid organic and steam streams.

3. A method according to claim 2 further including the step of mixing a portion of said steam stream with said waste to form a heated slurry.

4. A method according to claim 2 further including the step of injecting water into said cavity at a level above the injection of said waste material.

5. A method according to claim 1 further including the step of introducing a closed heat exchanger into said cavity and circulating heat exchange fluid through the heat exchanger.

6. A method according to claim 1 further including the step of forming a layer of oily liquid in the upper portion of the cavity above the surface of the rubble cone, entraining particles in the lower portion of the layer and removing oily liquid only from the upper portion of the layer.

7. A method according to claim 6 in which the level of said layer is controlled by measured withdrawal of oily products from said layer.

8. A method according to claim 1 in which the organic waste is sewage and further including the step of removing glass and metal objects from said waste before injecting the waste into the cavity.

9. A system for the disposal and recycling of organic waste comprising in combination:
   a highly permeable rubble rock cone cavity means disposed within a deep subsurface geothermal zone having a temperature of at least 300°F within a bed of the rubble cone, in which said cavity comprises a rubble cone formed from the detonation of a nuclear device within the strata;
   waste slurrying means on the surface for forming an aqueous slurry of the organic waste;
   first well means communicating between the waste slurrying means and a lower portion of the cavity substantially below the upper surface of the rubble cone for injecting said aqueous waste slurry directly into the bed of hot rubble whereby said waste is decomposed and destructively distilled in absence of oxygen into steam and high BTU value, combustible, hydrocarbon gaseous and liquid organic products as the waste rises thru the bed of hot rubble to the upper surface of the rubble cone; and
   second well means extending from the surface into the cavity for transferring said products to the surface.

10. A system according to claim 9 further including third well means having a first end communicating with the surface and a second closed end disposed within the cavity, a heat exchanger disposed within the second end and means for circulating heat exchange fluid through the heat exchanger.

11. A system according to claim 9 further including means for injecting water into said cavity whereby steam and additional gaseous products are formed.

12. A system according to claim 9 further including a liquid product layer formed in the upper portion of the cavity for filtering particulates from said products.

13. A system according to claim 12 in which said liquid product layer is an oily organic layer and the lower end of said third well means extends into the upper portion of said layer.

* * * * *